(12) United States Patent
Noune

(10) Patent No.: US 9,900,185 B2
(45) Date of Patent: Feb. 20, 2018

(54) DOPPLER SPREAD AND SNR ESTIMATION FOR A WIRELESS COMMUNICATIONS RECEIVER

(75) Inventor: Badreddine Noune, Bristol (GB)

(73) Assignee: Nvidia Corporation, Santa Clara, CA (US)

(*) Notice: Subject to any disclaimer, the term of this patent is extended or adjusted under 35 U.S.C. 154(b) by 663 days.

(21) Appl. No.: 13/614,317

(22) Filed: Sep. 13, 2012

(65) Prior Publication Data

US 2014/0071843 A1 Mar. 13, 2014

(51) Int. Cl.
*H04B 1/00* (2006.01)
*H04B 15/00* (2006.01)
*H04L 25/02* (2006.01)

(52) U.S. Cl.
CPC ........ *H04L 25/0228* (2013.01); *H04L 25/022* (2013.01); *H04L 25/0222* (2013.01)

(58) Field of Classification Search
CPC ............... H04L 25/022; H04L 25/0222; H04L 25/0228
USPC ........................................................ 455/63.1
See application file for complete search history.

(56) References Cited

U.S. PATENT DOCUMENTS

| | | | | |
|---|---|---|---|---|
| 2002/0032015 A1* | 3/2002 | Kitakado | ................. | H04B 7/01 455/277.1 |
| 2005/0113142 A1* | 5/2005 | Felter | ..................... | H04B 1/709 455/562.1 |
| 2005/0267370 A1* | 12/2005 | Park | ........................ | G01S 11/10 600/454 |
| 2009/0059885 A1* | 3/2009 | Sadek | .................. | H04L 5/0007 370/343 |
| 2010/0197254 A1* | 8/2010 | Yu | ......................... | H04L 25/025 455/179.1 |
| 2011/0280293 A1* | 11/2011 | Chevalier | ............... | G01S 7/292 375/224 |
| 2013/0034140 A1* | 2/2013 | Kil | ........................ | H04L 25/022 375/224 |
| 2013/0287080 A1* | 10/2013 | Li | ....................... | H04L 27/0014 375/224 |

OTHER PUBLICATIONS

Tepedelenlioglu, C., et al., "Estimation of Doppler spread and signal strength in mobile communications with applications to handoff and adaptive transmission," Wireless Communications and Mobile Computing 2001, pp. 221-242.

* cited by examiner

*Primary Examiner* — Ajibola Akinyemi
(74) *Attorney, Agent, or Firm* — Kevin Brown; Parker Justiss, P.C.

(57) ABSTRACT

A wireless communications receiver includes a receiving unit configured to receive a radio transmission having Doppler distortion and channel noise. Also included is an estimating unit coupled to the receiving unit and configured to determine a noise-abated maximum Doppler frequency estimate for the Doppler distortion. Additionally, the estimating unit is further configured to determine a signal-to-noise ratio (SNR) estimate based on the noise-abated maximum Doppler frequency estimate. In another aspect, a method of operating a wireless communications receiver is provided.

16 Claims, 6 Drawing Sheets

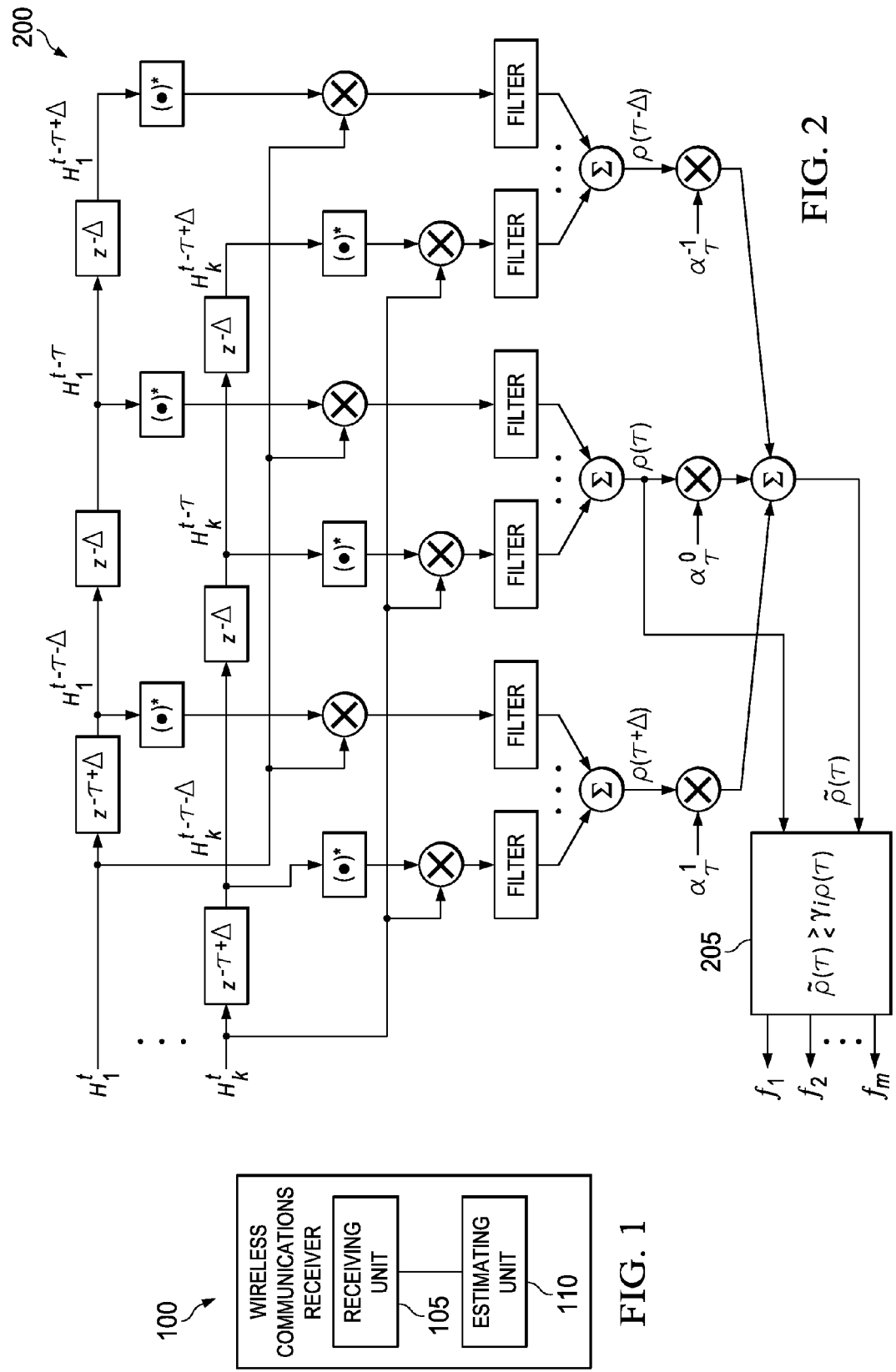

DOPPLER SPREAD AND SNR ESTIMATION FOR A WIRELESS COMMUNICATIONS RECEIVER

TECHNICAL FIELD

This application is directed, in general, to wireless communications and, more specifically, to a wireless communications receiver and a method of operating a wireless communications receiver.

BACKGROUND

In a wireless communication system, the characteristics of the propagation channel depend on the paths taken by a signal between transmit and receive antennas. These paths are functions of the stationary and moving reflector objects in the propagation environment, as well as the separation distance between the two antennas, which may also be changing. Furthermore, the presence of reflecting objects and scatterers in the propagation environment results in multiple replicas of the transmitted waveform that arrive at the receiver with different amplitude and phase, time delays and spatial orientations.

At a receiver, the incoming waves (multi-paths) arrive from different directions with different propagation delays, and with randomly distributed amplitudes, phases, and angles of arrival. When these multi-paths combine vectorially at the receiver, they cause the received signal to fade due to the constructive and destructive effects of multi-path wave combining at the receiver. Generally, the received signal is represented, mathematically, by convolving the transmitted signal with the channel impulse response, which can be modeled as a tapped delay line having a number of taps corresponding to the significant number of delayed receive signals.

In mobile wireless communications systems, combining of the multi-paths, with their random phases and amplitudes, results in rapid fluctuations in the signal's strength. It is possible to identify two types of fading, namely large-scale and small-scale fading. Large-scale fading represents the average attenuation in the signal power due to motion over large areas. Small-scale fading refers to the rapid fluctuation of the amplitude of a radio signal as a result of multi-path propagation over a short period of time, or equivalently, a short travel distance. Fading occurs as a result of the interference between two or more replicas of the transmitted waveform arriving at the receiver at two different time instants. When these signals combine at the receiver, the resultant signal can vary widely in both amplitude and phase depending on the intensity and relative propagation time of the multi-paths as well as the signal's bandwidth. The physical factors that influence small-scale fading include the multi-path richness of the propagation environment, the speed of the mobile, the speed of the surrounding objects and the transmission bandwidth of the signal.

Using the power delay profile of the propagation channel, multi-path channel parameters can be extracted that quantify the time dispersive properties of the multi-path propagation channel. If the channel's delay spread is much greater than the symbol duration, several attenuated and time delayed replicas of the transmitted waveform arrive at the receiver. When this occurs, the channel is said to exhibit frequency selective fading, as different spectral components experience different attenuation levels. On the other hand, if the delay spread of the channel is smaller than the symbol period, all spectral components experience the same channel attenuation level and the received signal is said to undergo a frequency flat fading. In this type of fading the spectral characteristics of the transmitted signal are preserved at the receiver, except that the received signal's strength changes with time as a result of the fluctuation in the channel's gain due to multipath fading.

For mobile radio applications, the channel is time variant because of the relative motion between a transmitter and a receiver or by movement of objects within the channel, which causes variations in the received signal's amplitude and phase. Consider a mobile receiver moving at a constant velocity v from point A to point B, such that the distance moved by the mobile receiver is d. The difference between the distance travelled by the waves from the source to A and B is $$\Delta l = v \Delta t \cos \theta, \tag{1}$$

where $\Delta t$ is the time required for the mobile to travel from A to B when traveling at a fixed velocity v, and $\theta$ is the angle of arrival in the azimuth plane for each ray that is assumed to remain constant. The phase change in the received signal due to the difference in the path lengths is therefore $$\Delta_\varphi = \frac{2\pi \Delta l}{\lambda} = \frac{2\pi \Delta t \cos\theta}{\lambda}, \tag{2}$$

where $\lambda$ is the carrier wavelength. The rate of change in $\Delta\varphi$ with respect to time is the apparent change in frequency or Doppler shift and is given by $$f_D = \frac{1}{2\pi}\frac{\Delta\varphi}{\Delta t} = \frac{v}{\lambda}\cos\theta = \frac{vf_c}{c}\cos\theta, \tag{3}$$

where $f_c$ is the carrier frequency and c denotes the speed of light in a vacuum ($c=3\times10^8$ m/s). The maximum value of the Doppler shift is $vf_c/c$.

Therefore, if the mobile receiver is moving in the direction of arrival of the wave, the Doppler shift is positive, and if the mobile receiver is moving away from the direction of arrival of the wave, the Doppler shift is negative. It should be noted that the Doppler shift applies to a single multi-path. Each multi-path is subject to a specific Doppler shift, which can be positive or negative depending on the direction of motion compared to the azimuth angle of arrival of the particular multi-path. For a given direction of receiver motion, the range of different Doppler shifts arising due to multi-paths arriving from different azimuth directions results in a Doppler frequency spread calculated as the difference between the largest positive and largest negative shift among the multi-paths.

SUMMARY

Embodiments of the present disclosure provide a wireless communications receiver and a method of operating a wireless communications receiver.

In one embodiment, the wireless communications receiver includes a receiving unit configured to receive a radio transmission having Doppler distortion and channel noise. Also included is an estimating unit coupled to the receiving unit and configured to determine a noise-abated maximum Doppler frequency estimate for the Doppler distortion. Additionally, the estimating unit is further configured to determine a signal-to-noise ratio (SNR) estimate based on the noise-abated maximum Doppler frequency estimate.

In another aspect, the method of operating a wireless communications receiver includes receiving a radio transmission having Doppler distortion and channel noise and determining a noise-abated maximum Doppler frequency estimate for the Doppler distortion. The method further includes determining a signal-to-noise ratio (SNR) estimate based on the noise-abated maximum Doppler frequency estimate.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which:

FIG. 1 illustrates a block diagram of a wireless communications receiver constructed according to the principles of the present disclosure;

FIG. 2 illustrates an example of the proposed scheme of Doppler frequency estimation using a (2n+1)-point Central Finite Difference approximation with n=1 and k reference signal (RS) sub-carriers;

DETAILED DESCRIPTION

Figure 3:
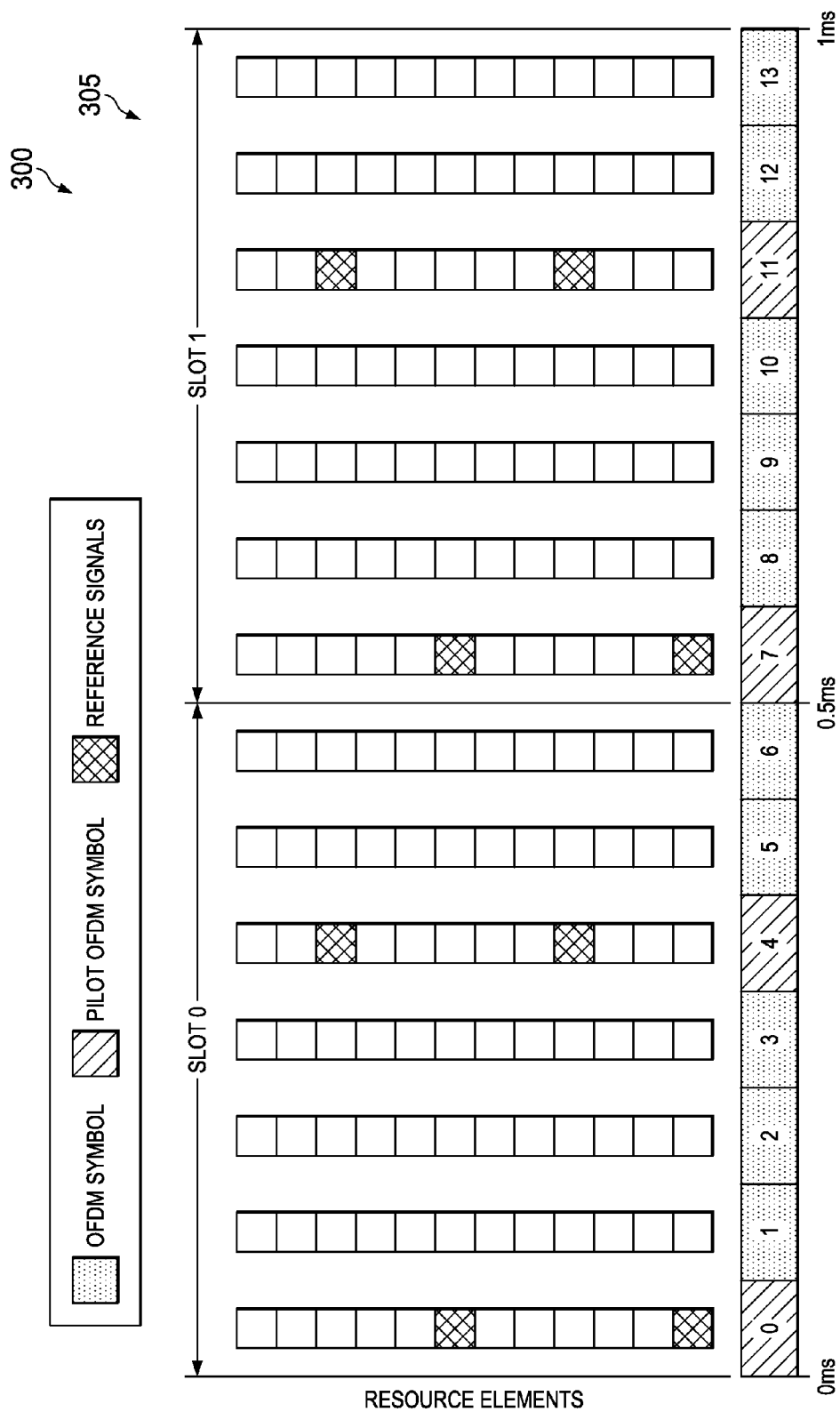
FIG. 3 illustrates an OFDMA time plan used to illustrate resource allocation within one resource block of a Third Generation Partnership Project (3GPP) Long Term Evolution (LTE) downlink signal configured for a single user.

Doppler estimation techniques may be categorized as Level-Crossing-Rate (LCR) based estimators or as estimators based on correlation or covariance of a mobile channel. A survey of existing techniques for estimating statistical parameters of the mobile channel may be found in "Estimation of Doppler Spread and Signal Strength in Mobile Communications with Applications to Handoff and Adaptive Transmission" by Cihan Tepedelenlioglu, et al, which is incorporated herein by reference.

Embodiments of the present disclosure relate to novel techniques for joint maximum Doppler frequency and noise power estimations based on a weighted sum of correlations of demodulated pilot data from a transmitted radio signal in a mobile communications channel. These embodiments employ two calculation approaches, where one is based on any non-zero time lag and the other is based on a zero time lag. In the latter case, the zero time-lag auto-correlation uses non-zero time-lag correlation values where a Doppler estimation scheme is then applied. For both Doppler estimation cases, two derivatives approximation approaches are considered (a finite difference method and a second method that employs properties of Fourier analysis). Additionally, a simpler approach to calculating separate signal and noise powers based on extrapolation is provided. Embodiments of the proposed techniques are broadly applicable to wireless communications systems.

FIG. 1 illustrates a block diagram of a wireless communications receiver, generally designated 100, constructed according to the principles of the present disclosure. The wireless communications receiver 100 includes a receiving unit 105 and an estimating unit 110. The receiving unit 105 is configured to receive a radio transmission having Doppler distortion and channel noise. The estimating unit is coupled to the receiving unit and configured to determine a noise-abated maximum Doppler frequency estimate for the Doppler distortion. Additionally, the estimating unit 110 is also configured to determine a signal-to-noise ratio (SNR) estimate based on the noise-abated maximum Doppler frequency estimate. Embodiments of the noise-abated maximum Doppler frequency estimate and the SNR estimate are provided in the following discussion.

The term $h_t[n]$ denotes the n-th tap of the channel impulse response at time t. It is assumed for all n that $h_t[n]$ is a wide-sense stationary (WSS) process, and that the realization of $h_t[n]$ are zero-mean, complex independent and identically distributed (i.i.d.) samples with the same underlying fading process, satisfying $$\forall n: E\{h_t[n](h_{t+\tau}[n])^*\} = J_0(2\pi f_D \tau) E\{|h_t[n]|^2\}, \quad (4)$$

and $$\forall n \neq m: E\{h_t[n](h_{t+\tau}[m])^*\} = 0. \quad (5)$$

where $J_0(x)$ denotes the zero order Bessel function of the first kind, and $f_D$ is the maximum Doppler frequency. Equation (5) arises from the fact that the scattering in a propagation environment is uncorrelated. The k-th sub-carrier of a propagation channel's frequency response at time t is $$H_k^t = \sum_{n=0}^{L-1} h_t[n] e^{-j\frac{2\pi k n}{N}} \quad (6)$$

Let $\rho_k(\tau)$ be the temporal correlation of the propagation channel's frequency response at sub-carrier k, for a time-lag $\tau$. Assuming an error-free estimation of the channel frequency response at a receiver, $\rho_k(\tau)$ is expressed as $$\rho_k(\tau) = E\{H_k^t (H_k^{t+\tau})^*\} = E\left\{\left(\sum_{n=0}^{L-1} h_t[n] e^{-j\frac{2\pi k n}{N}}\right)\left(\sum_{n=0}^{L-1} h_{t+\tau}[n] e^{-j\frac{2\pi k n}{N}}\right)^*\right\} \quad (7)$$

$$= E\left\{\left(\sum_{n=0}^{L-1}\sum_{m=0}^{L-1} h_t[n](h_{t+\tau}[m])^* e^{-j\frac{2\pi k(n-m)}{N}}\right)\right\} =$$

$$\sum_{n=0}^{L-1}\sum_{m=0}^{L-1}\left(E\{h_t[n](h_{t+\tau}[m])^*\} e^{-j\frac{2\pi k(n-m)}{N}}\right)$$

$$= \sum_{n=0}^{L-1} E\{h_t[n](h_{t+\tau}[n])^*\} = \left(\sum_{n=0}^{L-1} E\{|h_t[n]|^2\}\right) J_0(2\pi f_D \tau)$$

Let S denote the set of reference symbols' sub-carrier indices. Then, $\rho(\tau)$ is defined as $$\rho(\tau) = \sum_{k \in S} \rho_k(\tau) = |S| \left( \sum_{n=0}^{L-1} E\{h_l[n]^2\} \right) J_0(2\pi f_D \tau) \quad (8)$$

Existing Doppler estimation techniques depend on the following property $$(2\pi f_D)^2 \propto -\frac{\left.\frac{\partial^2 \rho(x)}{\partial x^2}\right|_0}{\rho(0)} \quad (9)$$

For received radio signals in the presence of noise, the correlation coefficient of the estimated channel response, after matched receiver filtering and for a time-lag $\tau$, is $\rho(\tau) = \rho_h(\tau) + \rho_n(\tau)$, with $\rho_h(\tau)$ and $\rho_n(\tau)$ denoting the channel and noise correlation functions for the time-lag $\tau$, respectively. The maximum Doppler frequency estimate from the above formula is highly influenced by noise. In particular, at a low signal-to-noise ratio (SNR) the estimate deviates from the true maximum Doppler frequency.

Using the properties of Bessel functions of the first kind, it can be verified that $$\frac{\partial x^n J_n(x)}{\partial x} = x^n J_{n-1}(x) \quad (10)$$

Therefore, $$\frac{\partial J_0(x)}{\partial x} = J_{-1}(x) = -J_1(x) \quad (11)$$

This leads to $$\left.\frac{\partial J_0(2\pi f_D x)}{\partial x}\right|_\tau = -2\pi f_D J_1(2\pi f_D \tau) \quad (12)$$

In addition, from equation (10)

$$\frac{\partial x J_1(x)}{\partial x} = J_1(x) + x\frac{\partial J_1(x)}{\partial x} = xJ_0(x) \Rightarrow \frac{\partial J_1(x)}{\partial x} = J_0(x) - \frac{1}{x}J_1(x) \quad (13)$$

Differentiating both sides of equation (12) with respect to $\tau$ leads to $$\left.\frac{\partial^2 J_0(2\pi f_D x)}{\partial x^2}\right|_\tau = -2\pi f_D \left.\frac{\partial J_1(2\pi f_D x)}{\partial x}\right|_\tau = \left(\frac{2\pi f_D}{\tau} J_1(2\pi f_D \tau) - (2\pi f_D)^2 J_0(2\pi f_D \tau)\right) = -\left(\frac{1}{\tau}\left(\left.\frac{\partial J_0(2\pi f_D x)}{\partial x}\right|_\tau\right) + (2\pi f_D)^2 J_0(2\pi f_D \tau)\right) \quad (14)$$

which is equivalent to the Bessel differential equation. Since $\rho(\tau) \propto J_0(2\pi f_D \tau)$, equation (14) produces $$(2\pi f_D)^2 = -\frac{\left(\frac{1}{\tau}\left(\left.\frac{\partial J_0(2\pi f_D x)}{\partial x}\right|_\tau\right) + \left.\frac{\partial^2 J_0(2\pi f_D x)}{\partial x^2}\right|_\tau\right)}{J_0(2\pi f_D \tau)} = -\frac{\left(\frac{1}{\tau}\left(\left.\frac{\partial \rho(\tau)}{\partial x}\right|_\tau\right) + \left.\frac{\partial^2 \rho(\tau)}{\partial x^2}\right|_\tau\right)}{\rho(\tau)} \quad (15)$$

Maximum Doppler frequency estimation, using equation (15), is a generalization of equation (9) for any time-lag $\tau$. This offers several practical advantages. First, even if the channel estimates at reference signal (RS) sub-carriers are noisy, the noise term in the correlation function will vanish when $\tau \neq 0$. For example, when $\tau$ is longer than the time span of the channel noise autocorrelation (i.e., if $\tau$ is such that $\rho_n(\tau) \approx 0$). As a result, the maximum Doppler frequency estimate cannot be influenced by noise, even at a low SNR. Consequently, the performance of the proposed scheme is guaranteed regardless of the SNR.

In the remainder of this disclosure, the maximum Doppler frequency $f_D$ is calculated at $\tau \neq 0$ and $\tau = 0$. For both approaches, it will be demonstrated that a maximum Doppler frequency approximation can be achieved using a weighted sum of correlations. These weights can be derived using a finite difference approximation or properties of the Fourier transform (FT).

First, consider the maximum Doppler frequency estimation for $\tau \neq 0$. The derivative of order $d$ at $\tau$ is approximated using a $(2n+1)$-point central finite difference, as a weighted sum of $\rho(\tau + i\Delta)$, for a step-size $\Delta$ and $-n \leq i \leq n$. The term $\Delta$ determines the temporal resolution for the derivatives approximation, and in the context of frequency-division duplexing (FDD) long term evolution (LTE) systems, $\Delta$ can be chosen to be equal to one or half a slot duration (i.e., 0.5 or 0.25 milliseconds, respectively). The Taylor expansion of $\rho(\tau + i\Delta)$ yields $$\sum_{i=-n}^{n} \varphi_i^d \rho(\tau + i\Delta) = \sum_{i=-n}^{n} \varphi_i^d \left( \sum_{m=0}^{\infty} i^m \frac{\Delta^m}{m!} \left.\frac{\partial^m \rho(x)}{\partial x^m}\right|_\tau \right) = \sum_{m=0}^{2n} \left( \left( \sum_{i=-n}^{n} \varphi_i^d i^m \right) \frac{\Delta^m}{m!} \left.\frac{\partial^m \rho(x)}{\partial x^m}\right|_\tau \right) + \varepsilon \quad (16)$$

For the desired approximation, the weights $\varphi_i^d$, in equation (16), satisfy $$\sum_{i=-n}^{n} \varphi_i^d i^m = \begin{cases} 0 & m \neq d \\ 1 & m = d \end{cases} \quad (17)$$

Let $e_d$ denote the unit column vector of length $(2n+1)$ with all zero entries except at $d$. From equation (16)

$$\begin{bmatrix} 1 & 1 & \ldots & 1 & 1 & 1 & \ldots & 1 & 1 \\ -n & -n+1 & \ldots & -1 & 0 & 1 & \ldots & n-1 & n \\ n^2 & (n-1)^2 & \ldots & 1 & 0 & 1 & \ldots & (n-1)^2 & n^2 \\ \vdots & \vdots & \vdots & \vdots & \vdots & \vdots & \vdots & \vdots & \vdots \\ n^{2n} & (n-1)^{2n} & \ldots & 1 & 0 & 1 & \ldots & (n-1)^{2n} & n^{2n} \end{bmatrix} \begin{bmatrix} \varphi_{-n}^d \\ \varphi_{-n+1}^d \\ \varphi_{-n+2}^d \\ \vdots \\ \varphi_n^d \end{bmatrix} = e_d, \quad (18)$$

which can be simplified to $\Gamma\varphi^d=e_d$, where $\Gamma$ is a transposed Vandermonde matrix. The coefficient can thus be found by solving the linear equation, leading to $\varphi^d=\Gamma^{-1}e_d$. Multiplying by $$\frac{d!}{\Delta^d},$$

produces $$\hat{\rho}^{(d)}(\tau) = \frac{d!}{\Delta^d}\sum_{i=-n}^{n}\varphi_i^d\rho(\tau+i\Delta) = \frac{\partial^d\rho(x)}{\partial x^d}\bigg|_\tau + \varepsilon \quad (19)$$

with error $\varepsilon$. For $d=1$ and $d=2$, let $\kappa_n^i=\varphi_i^1$ and $\lambda_n^i=2\varphi_i^2$. Equation (15) becomes $$(2\pi\hat{f}_D)^2 = -\frac{\sum_{i=-n}^{n}\left(\frac{\lambda_n^i}{\Delta^2}+\frac{\kappa_n^i}{\tau\Delta}\right)\rho(\tau+i\Delta)}{\rho(\tau)} = -\frac{\sum_{i=-n}^{n}(\tau\lambda_n^i+\Delta\kappa_n^i)\rho(\tau+i\Delta)}{\Delta^2\tau\rho(\tau)} \quad (20)$$

Choosing $\tau=m\Delta$, equation (20) yields $$(2\pi\hat{f}_D\Delta)^2 = -\frac{\sum_{i=-n}^{n}(2m\lambda_n^i+\kappa_n^i)\rho(\tau+i\Delta)}{m\rho(\tau)} \quad (21)$$

Alternatively, an n-th order forward finite difference approximation can be employed, using points $\tau$, $\tau+\Delta$, $\tau+2\Delta$, ..., $\tau+n\Delta$. Similar to equation (19), the coefficients of the forward finite difference approximation can be shown to be the solutions of the following linear equation $$\begin{bmatrix} 1 & 1 & \cdots & 1 & 1 \\ 0 & 1 & \cdots & n-1 & n \\ 0 & 1 & \cdots & (n-1)^2 & n^2 \\ \vdots & \vdots & \vdots & \vdots & \vdots \\ 0 & 1 & \cdots & (n-1)^n & n^n \end{bmatrix} \begin{bmatrix} \varphi_0^d \\ \varphi_1^d \\ \varphi_2^d \\ \vdots \\ \varphi_n^d \end{bmatrix} = e_d \quad (22)$$

Now, consider the maximum Doppler frequency estimation at $\tau=0$. The zero order Bessel function of the first kind is an even function, (i.e., $\rho(-i\Delta)=\rho(i\Delta)$). Given that the central finite difference coefficients for the second derivative satisfy $\lambda_n^{-i}=\lambda_n^i$, equation (9) becomes $$(2\pi\hat{f}_D\Delta)^2 = -\frac{\sum_{i=-n}^{n}\lambda_0^i\rho_h(i\Delta)}{\rho_h(0)} = \quad (23)$$

$$-\frac{\lambda_0^0\rho_h(0)+2\sum_{i=1}^{n}\lambda_0^i\rho_h(i\Delta)}{\rho_h(0)} = -\frac{2\sum_{i=1}^{n}\lambda_0^i\rho_h(i\Delta)}{\rho_h(0)} - \lambda_0^0$$

In order to use this approximation, the signal power $\rho_h(0)$ is calculated. Two approaches to calculate $\rho_h(0)$ are discussed below.

In a first approach, signal power is calculated using the first derivative of $J_0(x)$. Since the first derivative of the zero-order Bessel function of the first kind at zero is zero, it follows that $$\rho'_h(\tau) = \frac{\partial\rho(x)}{\partial x}\bigg|_0 = 0 \quad (24)$$

Therefore, it is possible to calculate $\rho_h(0)$ using an n-th order ((n+1)-point) forward finite difference approximation of the first derivative for $\rho_h'(0)=0$. From the forward finite difference approximation $$\rho'_h(\tau) = \frac{1}{\Delta}\sum_{i=0}^{n}\varphi_i^1\rho_h(\tau+i\Delta) = 0 \Rightarrow \rho_h(0) = -\frac{\sum_{i=1}^{n}\varphi_i^1\rho_h(i\Delta)}{\varphi_{i0}^1} \quad (25)$$

Substituting equation (25) into equation (23) yields $$(2\pi\hat{f}_D\Delta)^2 = \quad (26)$$

$$\frac{-\lambda_0^0\left(\sum_{i=1}^{n}\varphi_i^1\rho_h(i\Delta)\right)+2\varphi_0^1\sum_{i=1}^{n}\lambda_0^i\rho_h(i\Delta)}{\left(\sum_{i=1}^{n}\varphi_i^1\rho_h(i\Delta)\right)} = \frac{\sum_{i=1}^{n}(2\varphi_0^1\lambda_0^i-\lambda_0^0\varphi_i^1)\rho_h(i\Delta)}{\left(\sum_{i=1}^{n}\varphi_i^1\rho_h(i\Delta)\right)}$$

In a second approach, signal power is calculated using extrapolation. From the Taylor expansion describe previously, it is possible to calculate $\rho_h(0)$ using an n-th order (n-point) extrapolation of the form $$\rho_h(0) = \sum_{i=1}^{n}\varphi_i^0\rho_h(i\Delta) \quad (27)$$

Similar to equation (19), the coefficients of the extrapolation can be shown to be solutions of the following linear problem $$\begin{bmatrix} 1 & \cdots & 1 & 1 \\ 1 & \cdots & n-1 & n \\ 1 & \cdots & (n-1)^2 & n^2 \\ \vdots & \vdots & \vdots & \vdots \\ 1 & \cdots & (n-1)^{n-1} & n^{n-1} \end{bmatrix} \begin{bmatrix} \varphi_1^0 \\ \varphi_2^0 \\ \varphi_3^0 \\ \vdots \\ \varphi_n^0 \end{bmatrix} = e_0 \quad (28)$$

which is formulated using delays $\Delta$, $2\Delta$, ..., $n\Delta$. Substituting the solution of this linear equation into equation (27), gives the signal power $\rho_h(0)$. Substituting equation (27) into equation (23) yields $$(2\pi\hat{f}_D\Delta)^2 = \quad (29)$$

$$-\frac{\lambda_0^0\left(\sum_{i=1}^{n}\varphi_i^0\rho_h(i\Delta)\right)+2\sum_{i=1}^{n}\lambda_0^i\rho_h(i\Delta)}{\left(\sum_{i=1}^{n}\varphi_i^0\rho_h(i\Delta)\right)} = \frac{\sum_{i=1}^{n}(2\lambda_0^i-\lambda_0^0\varphi_i^0)\rho_h(i\Delta)}{\left(\sum_{i=1}^{n}\varphi_i^0\rho_h(i\Delta)\right)}$$

Here, an alternative approach to finite difference approximation using properties of the Fourier transform (FT) is employed in order to calculate the first and second order derivatives. Let $\dot{\rho}(\tau)$ and $\ddot{\rho}(\tau)$ denote the first and second derivatives of $\rho(x)$ at $\tau$, respectively. The discrete-time correlation is defined as $\rho[n]=\rho(\tau=n\Delta)$, where $\Delta$ represents the temporal resolution and can be chosen to be equal to one or half a slot duration (i.e., 0.5 or 0.25 milliseconds, respectively). Similarly, $\dot{\rho}[n]=\dot{\rho}(\tau=n\Delta)$ and $\ddot{\rho}[n]=\ddot{\rho}(\tau=n\Delta)$ are defined.

The discrete-time Fourier transform (DTFT) of $\rho[n]$, denoted by $\wp(f)$, is $$\wp(f) = \sum_{n=-\infty}^{\infty} \rho[n] e^{-j2\pi f n \Delta} \tag{30}$$

Using DTFT properties, the DTFT of $\dot{\rho}[n]$ and $\ddot{\rho}[n]$, denoted $\dot{\wp}(f)$ and $\ddot{\wp}(f)$, respectively, are $$\dot{\wp}(f) = j2\pi f \wp(f), \tag{31}$$

and $$\ddot{\wp}(f) = -(2\pi f)^2 \wp(f) \tag{32}$$

The Discrete Fourier Transform (DFT) of $\dot{\rho}[n]$ and $\ddot{\rho}[n]$, denoted $\dot{\wp}[k]$ and $\ddot{\wp}[k]$, respectively, are $$\dot{\wp}[k] = \dot{\wp}\left(f = \frac{k}{N\Delta}\right) = j2\pi \frac{k}{N\Delta} \wp[k] \text{ and} \tag{33}$$

$$\ddot{\wp}[k] = \ddot{\wp}\left(f = \frac{k}{N\Delta}\right) = -\left(2\pi \frac{k}{N\Delta}\right)^2 \wp[k] \tag{34}$$

where $\wp[k]$ represents the DFT of $\rho[n]$. The discrete-time first and second derivatives of $\rho[n]$, denoted $\dot{\rho}[n]$ and $\ddot{\rho}[n]$, respectively, can be found from the inverse DFT (IDFT) of $\dot{\wp}[k]$ and $\ddot{\wp}[k]$, respectively $$\dot{\rho}[n] = \frac{1}{N}\sum_{k=1-\frac{N}{2}}^{\frac{N}{2}} \dot{\wp}[k] e^{j\frac{2\pi k n}{N}} = \frac{1}{N}\sum_{k=1-\frac{N}{2}}^{\frac{N}{2}} \frac{j2\pi k}{N\Delta} \wp[k] e^{j\frac{2\pi k n}{N}} \tag{35}$$

and $$\ddot{\rho}[n] = \frac{1}{N}\sum_{k=1-\frac{N}{2}}^{\frac{N}{2}} \ddot{\wp}[k] e^{j\frac{2\pi k n}{N}} = -\frac{1}{N}\sum_{k=1-\frac{N}{2}}^{\frac{N}{2}} \left(2\pi \frac{k}{N\Delta}\right)^2 \wp[k] e^{j\frac{2\pi k n}{N}} \tag{36}$$

Derivative approximation at $\tau \neq 0$ employs substituting $\dot{\rho}[n]$ and $\ddot{\rho}[n]$ into equation (15), for $\tau = n\Delta$, yielding $$(2\pi \hat{f}_D)^2 = -\frac{\frac{1}{n\Delta}\dot{\rho}[n] + \ddot{\rho}[n]}{\rho[n]} = \tag{37}$$

$$-\frac{\sum_{k=1-\frac{N}{2}}^{\frac{N}{2}} \left(\left(2\pi\frac{k}{N}\right)^2 - \frac{j2\pi k}{Nn}\right) \wp[k] e^{j\frac{2\pi k n}{N}}}{N\Delta^2 \rho[n]} = \frac{\sum_{m=0}^{N-1} \omega_n[m]\rho[(n-m)_N]}{N\Delta^2 \rho[N]}$$

where $(\bullet)_N$ denotes the modulo N operation, and $\omega_n[m]$ is given by $$\omega_n[m] = \sum_{k=1-\frac{N}{2}}^{\frac{N}{2}} \left(\left(2\pi\frac{k}{N}\right)^2 - \frac{j2\pi k}{Nn}\right) e^{j\frac{2\pi k m}{N}} \tag{38}$$

It should be noted that $\rho[0]$ is estimated using the approaches described in developing the maximum Doppler frequency estimation at $\tau=0$.

Derivative approximation at $\tau=0$ employs substituting $\ddot{\rho}[n]$ into equation (15) and re-writing as $$(2\pi\hat{f}_D)^2 = -\frac{\ddot{\rho}[0]}{\rho[0]} = -\frac{\sum_{k=1-\frac{N}{2}}^{\frac{N}{2}} \left(2\pi\frac{k}{N}\right)^2 \wp[k]}{N\Delta^2 \rho[n]} = \frac{\sum_{m=0}^{N-1}\omega_0[m]\rho[N-m]}{N\Delta^2 \rho[0]} \tag{39}$$

where $\omega_0[m]$ is given by $$\omega_0[m] = \sum_{k=1-\frac{N}{2}}^{\frac{N}{2}} \left(2\pi\frac{k}{N}\right)^2 e^{j\frac{2\pi k m}{N}} \tag{40}$$

In the following, the proposed maximum Doppler estimation scheme is extended for SNR estimation. The linear SNR is given by $$SNR_{LIN} = \frac{\rho_h(0)}{\rho_n(0)} \tag{41}$$

First, the SNR is calculated for $\tau \neq 0$. Given that the maximum Doppler frequency is constant regardless of the time-lag $\tau$, it is possible to calculate the time-lag zero correlation function $\rho_h(0)$, once the maximum Doppler frequency has been computed. This is achieved as follows. From equation (20), the signal power $\rho_h(0)$, is $$\rho_h(0) = \frac{2\sum_{i=1}^{n}\lambda_0^i \rho_h(i\Delta)}{(2\pi\hat{f}_D\Delta)^2 + \lambda_0^0} = \frac{2\tau\rho_h(\tau)\left(\sum_{i=1}^{n}\lambda_0^i \rho_h(i\Delta)\right)}{\left(\sum_{i=-n}^{n}(m\lambda_m^i + \kappa_m^i)\rho_h(\tau+i\Delta)\right) - \lambda_0^0 \tau \rho_h(\tau)} \tag{42}$$

The noise power is then given by $$\rho_n(0) = \rho(0) - \rho_h(0) \tag{43}$$

$$= \rho(0) + \frac{2\sum_{i=1}^{n}\lambda_0^i \rho_h(i\Delta)}{(2\pi\hat{f}_D\Delta)^2 + \lambda_0^0} = \tag{44}$$

-continued $$\frac{\rho(0)\left(\sum_{i=-n}^{n}(m\lambda_m^i+\kappa_m^i)\rho_h(\tau+i\Delta)\right)-\tau\rho_h(\tau)\left(\sum_{i=-n}^{n}\lambda_0^i\rho_h(i\Delta)\right)}{\left(\sum_{i=1}^{n}(m\lambda_m^i+\kappa_m^i)\rho_h(\tau+i\Delta)\right)-\lambda_0^0\tau\rho_h(\tau)}$$

Second, the SNR is calculated for $\tau=0$. Since the signal power can be estimated as shown in equations (27) and (25), the noise power can be calculated as shown in equation (43).

FIG. 2 illustrates an example of the proposed scheme of Doppler frequency estimation, generally designated 200, using a (2n+1)-point Central Finite Difference approximation with n=1 and k RS sub-carriers. Overall, for a given n, a numerator requires (|S|+1)×(2n+1) complex multiplications and (|S|×(2n+1)) complex additions, whereas a denominator requires (|S|+1) complex multiplications and |S| complex additions. Furthermore, $\tau$ and $\Delta$ must satisfy $\tau>n\Delta$ so that the term $\rho(0)$ is not present in the calculation of the maximum Doppler frequency estimate as per equation (20).

In the Doppler frequency estimation scheme 200, the terms $H_1^t, \ldots, H_k^t$, represent k subcarriers for k pilot positions at time t, and the operator $z^{-T}$ represents a delay of time T. The operator $(\bullet)^*$ provides the complex conjugate of its input, and the multiplication operator $\otimes$ provides the product of its two inputs. Generally, this input structure provides a time-frequency grid where the terms $H_1^t, \ldots, H_k^t$, employing different frequencies are processed over different delay times. Specifically, the conjugate of an older sample is multiplied by a newer sample, which provides the correlation function of the two samples for a given delay. These correlation functions are then filtered wherein the filtering provides the mean value of its corresponding input correlation functions.

The filter outputs corresponding to the same delay are summed (a three point summation in this example) to provide the quantities $\rho(\tau+\Delta)$, $\rho(\tau)$ and $\rho(\tau-\Delta)$, as shown. These quantities are multiplied by scalar quantities $\alpha_\tau^1$, $\alpha_\tau^0$ and $\alpha_\tau^{-1}$, respectively, and summed again to provide a quantity $\tilde{\rho}(\tau)$, which is the weighted summation of all the filtered correlations. The quantities $\rho(\tau)$ and $\tilde{\rho}(\tau)$ are provided to a comparison function 205, which determines if $\tilde{\rho}(\tau)$ is greater or less than threshold quantities $\gamma_i\rho(\tau)$, where $\gamma_i$ represents the thresholds that divide the Doppler frequencies into chosen frequency bins representing Doppler frequency ranges. This is done to circumvent having to employ division in the solution. Then, only one of the output Doppler frequency bin identifiers $f_1, f_2, \ldots, f_m$, is indicated as an output meaning that the Doppler frequency falls within that frequency range.

Turning now to a maximum Doppler frequency $f_D$ calculation using three-point difference coefficients for $\tau=\Delta$, the three-point forward finite difference approximations of the first and second derivatives are given by $$\rho'(\tau)=\frac{-3\rho_h(\tau)+4\rho_h(\tau+\Delta)-\rho_h(\tau+2\Delta)}{2\Delta} \quad (45)$$

and $$\rho''(\tau)=\frac{\rho_h(\tau)-2\rho_h(\tau+\Delta)+\rho_h(\tau+2\Delta)}{\Delta^2} \quad (46)$$

Then, calculating the maximum Doppler frequency $f_D$ at $\tau=\Delta$ yields $$(2\pi\hat{f}_D\Delta)^2=\frac{\rho_h(\Delta)-\rho_h(3\Delta)}{2\rho_h(\Delta)} \quad (47)$$

FIG. 3 illustrates an OFDMA time plan, generally designated 300, used to illustrate resource allocation within one resource block of an LTE downlink signal configured for a single user. In the example of FIG. 3, an LTE downlink sub-frame of duration $\tau_{sf}=1$ millisecond is shown. The horizontal direction represents OFDMA symbols, as shown. The vertical direction represents the sub-carriers of the resource block, as shown. Each sub-frame consists of two slots of duration $\tau_{sl}=0.5$ milliseconds. In this example, the reference symbols are located in the first and fifth OFDMA symbol of each slot.

Calculating the maximum Doppler frequency $f_D$ for a step size $\Delta=0.5$ milliseconds in the OFDMA time plan 300, the reference signals (Pilots) are located on the first (index 0) and seventh (index 6) sub-carriers, of the resource block, in the first OFDMA pilot symbol of each slot, and on the fourth (index 3) and tenth (index 9) sub-carriers, of the resource block, in the second OFDMA pilot symbol of each slot. A set of pilots $S=\{0, 3, 6, \ldots, (12M-3)\}$ can be defined, with M denoting the number of resource blocks. The correlations $\rho_l(\tau)$ from equation (7) for $l\in\{0, 6, 12 \ldots, (12M-6)\}$ are calculated from the first OFDMA pilot symbol channel estimates whereas those for $l\in\{3, 9, \ldots, (12M-3)\}$ are calculated from the second OFDMA pilot symbol channel estimates. The Maximum Doppler frequency $f_D$ can then be calculated using a three-point forward finite difference approximation as described above for $\Delta=\tau_{sl}$.

In calculating the maximum Doppler frequency $f_D$, for the OFDMA time plan 300, the accuracy of the proposed maximum Doppler frequency estimation is more closely tied to an accuracy of the finite difference derivative approximation. In order to reduce the magnitude of error in the derivative approximations (and hence increase the accuracy of a Doppler estimation), the step size $\Delta$ has to be reduced. As shown in FIG. 3, pilot OFDMA symbols are transmitted at a rate smaller than the slot duration (i.e., the distance in time between the first and second pilot OFDMA symbols is in fact $$\frac{4}{7}\tau_{sl}).$$

Assume that the channel correlation for $$\tau=\frac{4}{7}\tau_{sl}$$

is equal to the channel correlation for $$\tau=\frac{1}{2}\tau_{sl},$$

(i.e., $$\rho\left(\frac{4}{7}\tau_{sl}\right)\approx\rho\left(\frac{1}{2}\tau_{sl}\right),$$

where the difference $$\left(\frac{4}{7}\tau_{sl} - \frac{1}{2}\tau_{sl} = \frac{1}{14}\tau_{sl}\right)$$

is equal to the duration of half an OFDMA symbol (35.7 ns)). For a carrier frequency $f_c$ equal to 2.1 GHz, a receiver needs to travel at a speed of 700 kmph ($f_D$=1390 Hz) to cause a change of as much as 0.15 (less than 12%) between $$\rho\left(\frac{4}{7}\tau_{sl}\right)$$

and $$\rho\left(\frac{1}{2}\tau_{sl}\right).$$

If the receiver travels at 450 kmph ($f_D$=833 Hz), a change of 0.1 (less than 5%) is seen. Also, for velocities below 200 kmph ($f_D$=370 Hz), an error less than 0.02 (less than 1%) occurs.

Then, assume that any errors due to this criterion can be modeled as noise. The resolution of the Bessel function curve can be increased by choosing a smaller step size, namely $$\Delta = \frac{1}{2}\tau_{sl}.$$

However, this requires a revision of the channel correlation to be used since the reference signals in the first and second pilot OFDMA symbols are transmitted at different sub-carriers (i.e., there is a sub-carrier offset of three), whereas in equation (7) it was assumed that the channel estimates are from the same sub-carrier.

Calculate the time-lag $\tau$ channel correlation between two sub-carriers with an offset 1. Let $\rho_{k,l}(\tau)$ be the correlation between sub-carriers k and (k+l) for a time-lag $\tau$. This is expressed as $$\rho_{k,l}(\tau) = E\{H_k^t(H_{k+l}^{t+\tau})^*\} = \left(\sum_{m=0}^{L-1} E\{|h_t[m]|^2\}e^{-j\frac{2\pi lm}{N}}\right)J_0(2\pi f_D\tau) = \tag{48}$$

$$\frac{\left(\sum_{m=0}^{L-1} E\{|h_t[m]|^2\}e^{-j\frac{2\pi lm}{N}}\right)}{\left(\sum_{n=0}^{L-1} E\{|h_t[m]|^2\}\right)}\rho_k(\tau)$$

It can be shown that $\rho_{k,0}(\tau)=\rho_k(\tau)$ and $\rho_{k,-l}(\tau)=(\rho_{k,l}(\tau))^*$. In the context of FDD LTE, the set of pilot sub-carrier indices are S={0, 6, . . . , (12M−6)} and l=3.

Define $$\rho(l,\tau) = \sum_{k \in S}\rho_{k,l}(\tau) = \tag{49}$$

-continued $$\frac{\left(\sum_{m=0}^{L-1} E\{|h_t[m]|^2\}e^{-j\frac{2\pi lm}{N}}\right)}{\left(\sum_{n=0}^{L-1} E\{|h_t[m]|^2\}\right)}\sum_{k \in S}\rho_k(\tau) = \frac{\left(\sum_{m=0}^{L-1} E\{|h_t[m]|^2\}e^{-j\frac{2\pi lm}{N}}\right)}{\left(\sum_{n=0}^{L-1} E\{|h_t[m]|^2\}\right)}\rho(\tau)$$

Since $\rho(l,\tau) \propto \rho(\tau)$, equation (15) may be rewritten as $$(2\pi f_D)^2 = -\frac{\left(\frac{1}{\tau}\left(\frac{\partial \rho(l,x)}{\partial x}\bigg|_\tau\right) + \frac{\partial^2 \rho(l,x)}{\partial x^2}\bigg|_\tau\right)}{\rho(l,x)} \tag{50}$$

Using the three-point forward finite difference approximation in equation (47), the following can be written $$(2\pi \hat{f}_D\Delta)^2 = \tag{51}$$

$$\frac{\rho_h(l,\Delta) - \rho_h(l,3\Delta)}{2\rho_h(l,\Delta)} = \frac{|\rho_h(l,\Delta)|^2 - \Re\{(\rho_h(l,\Delta))^*\rho_h(l,3\Delta)\}}{2|\rho_h(l,\Delta)|^2}$$

where $\rho_h(l,\Delta)$ is obtained from correlating the channel estimates from the first pilot OFDMA symbol with those from the second pilot OFDMA symbol, and $\rho_h(l,3\Delta)$ is obtained from correlating the channel estimates from the first pilot OFDMA symbol, in the current slot, with those from the second pilot OFDMA symbol in the next slot. As a result of the previous assumption, it is also considered that $$\rho\left(\frac{11}{7}\tau_{sl}\right) \approx \rho\left(\frac{3}{2}\tau_{sl}\right).$$

It should be noted that the real part of $(\rho_h(l,\Delta))^*\rho_h(l,3\Delta)$ is taken, since $(2\pi\hat{f}_D\Delta)^2$ is a real quantity.

From the three point forward finite difference approximation, the signal power $\rho_h(0)$ can be approximated as $$\rho'(0) = \frac{-3\rho_h(0) + 4\rho_h(\Delta) - \rho_h(2\Delta)}{2\Delta} = 0 \Rightarrow \rho(0) = \frac{4\rho_h(\Delta) - \rho_h(2\Delta)}{3} \tag{52}$$

Figure 4A:
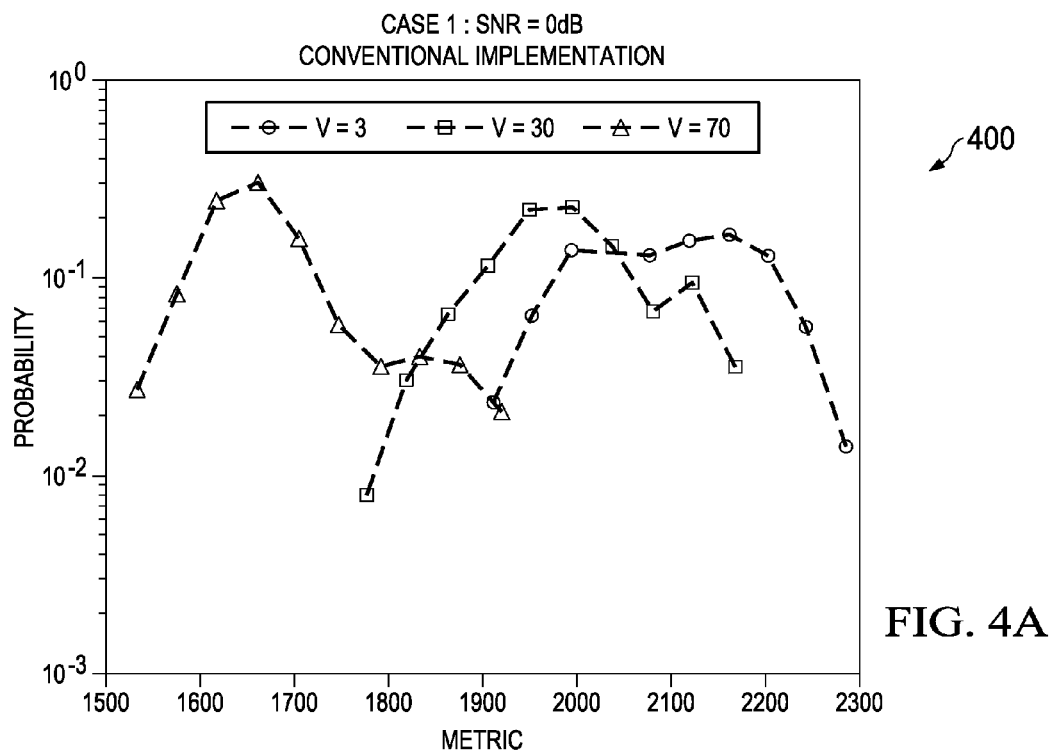
FIGS. 4A-4F illustrate comparisons between a Doppler estimation metric for conventional and proposed implementations having different velocities and different SNRs.
Figure 4B:
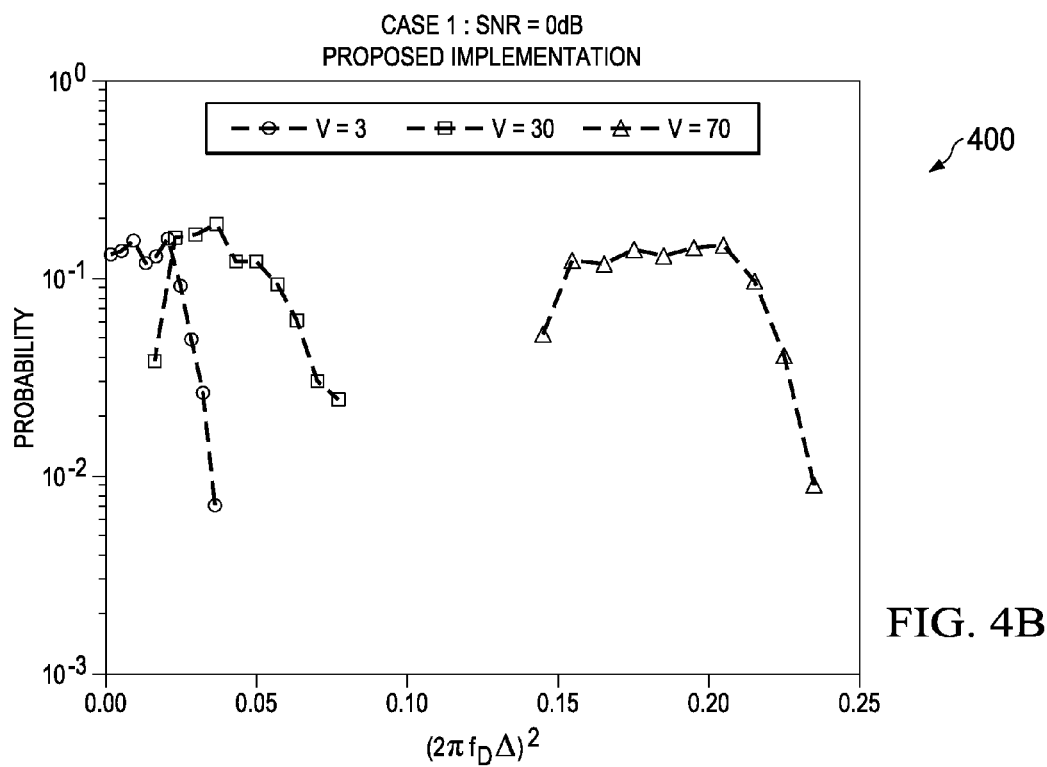
Figure 4C:
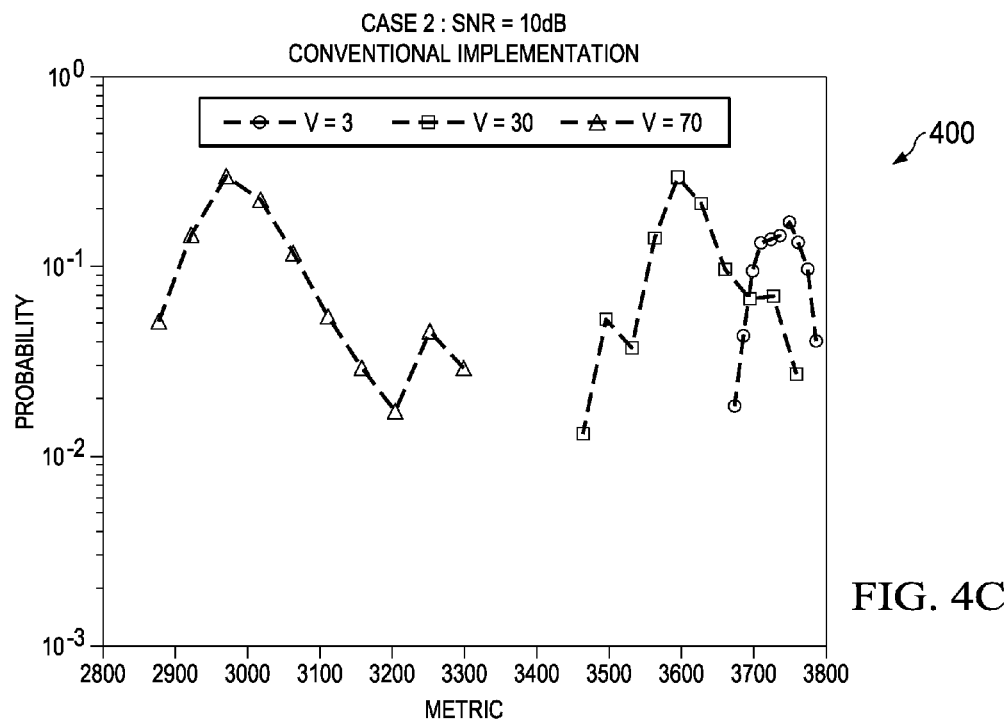
Figure 4D:
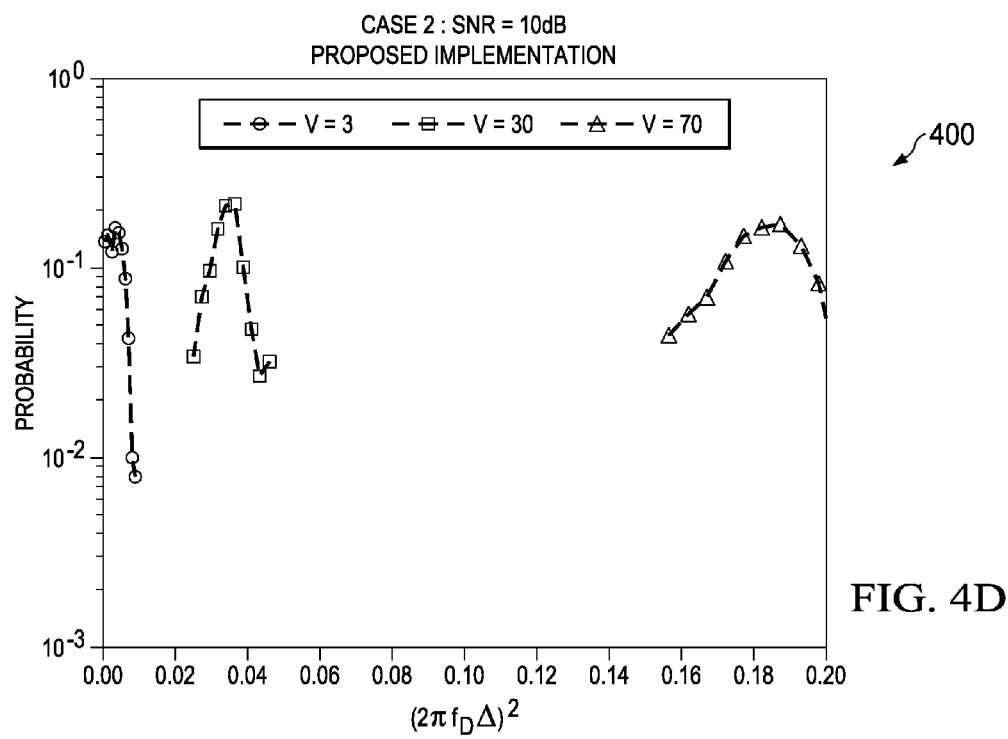
Figure 4E:
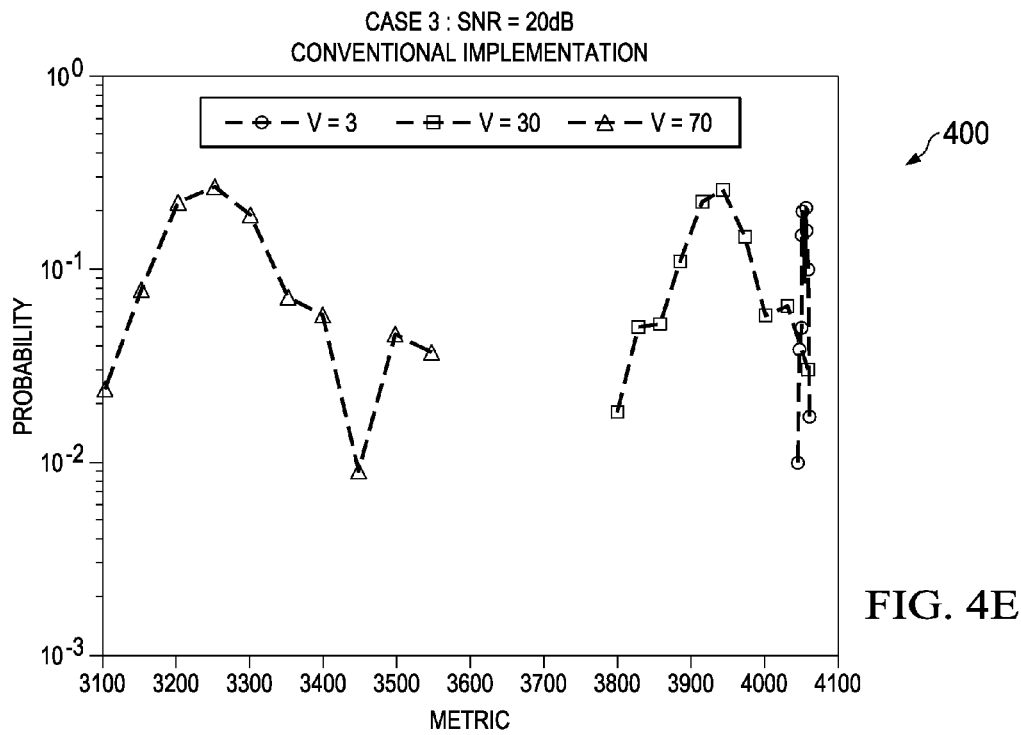
Figure 4F:
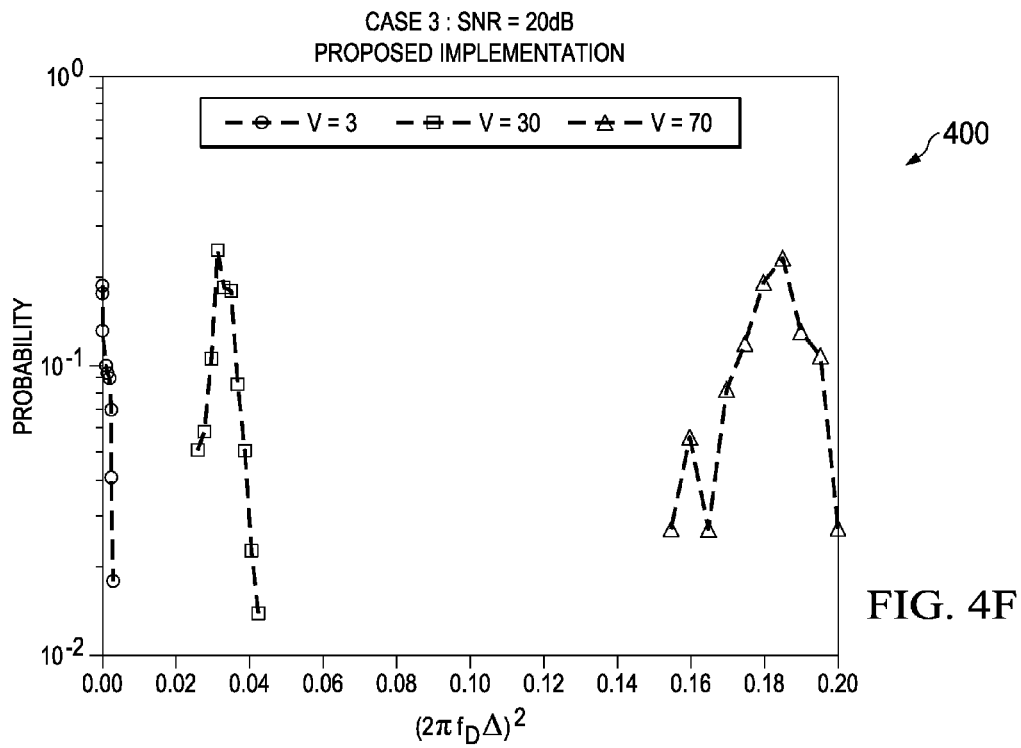

FIGS. 4A-4F illustrate comparisons between a Doppler estimation metric for conventional and proposed implementations having different velocities and different SNRs. FIGS. 4A and 4B provide comparisons for an SNR of 0 dB; FIGS. 4C and 4D provide comparisons for an SNR of 10 dB and FIGS. 4E and 4F provide comparisons for an SNR of 20 dB. These results were generated for a 10 MHz downlink LTE transmission (corresponding to 200 RS per slot) using a Pedestrian B channel profile corresponding to speeds of 3, 30 and 70 kmph.

For the proposed implementation, it was assumed that $\tau$=1 millisecond (i.e., two slots) and $\Delta$=0.5 milliseconds (i.e., one slot). In the conventional implementation, the calculated metric $$\frac{\rho(\tau)}{\rho(0)}$$

is shown for τ=1 millisecond (two slots). In both instances, the Doppler estimate is updated every 80 milliseconds, where an infinite impulse response (IIR) coefficient of 1/64 is used for averaging.

Comparing both schemes, it can be seen that the proposed implementation offers several key advantages compared with the conventional implementation. First, as the SNR increases, the mean of each velocity curve remains constant for the proposed scheme, while in the conventional implementation, the Doppler metric varies with the SNR. This means that, unlike the conventional implementation, the thresholds used in the proposed implementation to distinguish between different velocities need not change for different SNRs. Secondly and also contrary to the conventional implementation, as the SNR increases it becomes easier to distinguish between low velocities (as is shown in the case of 3 kmph and 30 kmph). This demonstrates that the proposed scheme is not limited by the presence of noise in the channel estimates. It may be noted however, that in the case of 0 dB SNR at low velocity, more averaging may be require to obtain improved results.

Figure 5:
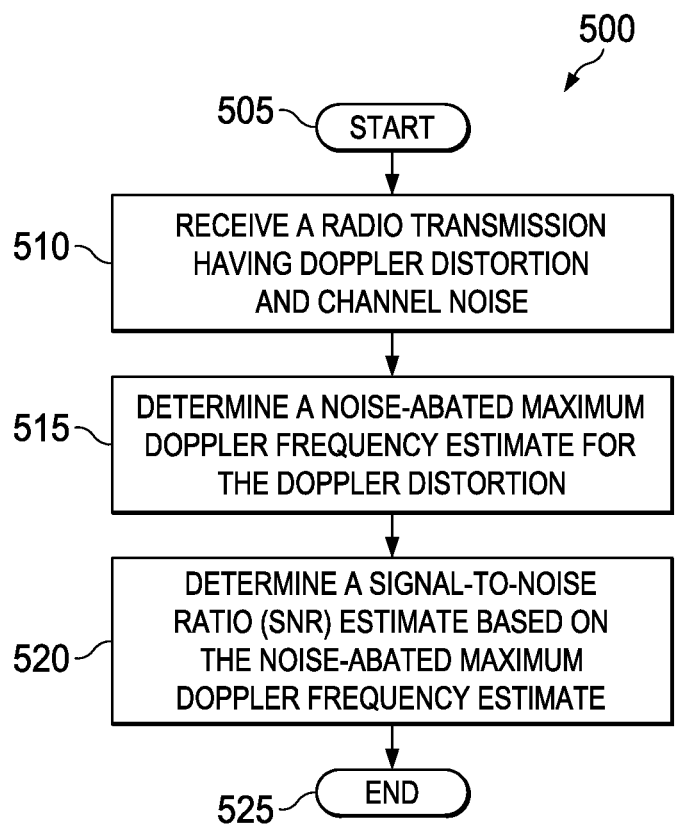
FIG. 5 illustrates a flow diagram of an embodiment of a method of operating a wireless communications receiver carried our according to the principles of the present disclosure.

FIG. 5 illustrates a flow diagram of an embodiment of a method of operating a wireless communications receiver, generally designated 500, carried out according to the principles of the present disclosure. The method 500 starts in a step 505, and a radio transmission is received having Doppler distortion and channel noise, in a step 510. Then, a noise-abated maximum Doppler frequency estimate is determined for the Doppler distortion, in a step 515. Additionally, a signal-to-noise ratio (SNR) estimate based on the noise-abated maximum Doppler frequency estimate is further determined in a step 520.

In one embodiment, determining the noise-abated maximum Doppler frequency estimate uses a finite difference approximation. In another embodiment, determining the noise-abated maximum Doppler frequency estimate uses a weighted sum of correlations. In yet another embodiment, determining the noise-abated maximum Doppler frequency estimate uses a signal power employing a first derivative of the zero order Bessel function of the first kind. In still another embodiment, determining the noise-abated maximum Doppler frequency estimate uses a signal power employing extrapolation.

In a further embodiment, determining the noise-abated maximum Doppler frequency estimate uses first and second order derivatives based on properties of the discrete Fourier transform. In yet another embodiment, determining the noise-abated maximum Doppler frequency estimate is provided as one of a range of Doppler frequencies. In still another embodiment, the SNR estimate employs a signal power determined from the noise-abated maximum Doppler frequency estimation. Additionally, the SNR estimate employs a noise power determined from the channel noise and the signal power. The method 500 ends in a step 525.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A wireless communications receiver, comprising:
a receiving unit configured to receive a radio transmission having Doppler distortion and channel noise; and
an estimating unit coupled to the receiving unit and configured to determine a noise-abated maximum Doppler frequency estimate for the Doppler distortion using a weighted sum of correlations of demodulated pilot data from said radio transmission;
wherein the noise-abated maximum Doppler frequency estimate is determined using a finite difference approximation.

2. The receiver as recited in claim 1 wherein a signal power used in the noise-abated maximum Doppler frequency estimate is determined using a first derivative of the zero order Bessel function of the first kind.

3. The receiver as recited in claim 1 wherein a signal power used in the noise-abated maximum Doppler frequency estimate is determined using extrapolation.

4. A wireless communications receiver, comprising:
a receiving unit configured to receive a radio transmission having Doppler distortion and channel noise; and
an estimating unit coupled to the receiving unit and configured to determine a noise-abated maximum Doppler frequency estimate for the Doppler distortion using a weighted sum of correlations of demodulated pilot data from said radio transmission;
wherein the noise-abated maximum Doppler frequency estimate is determined using first and second order derivatives based on properties of the discrete Fourier transform.

5. The receiver as recited in claim 1 wherein the noise-abated maximum Doppler frequency estimate is determined as one of a range of Doppler frequencies.

6. The receiver as recited in claim 1 wherein the estimating unit is further configured to determine a signal-to-noise ratio (SNR) estimate based on the noise-abated maximum Doppler frequency estimate.

7. The receiver as recited in claim 6 wherein the SNR estimate employs a signal power determined from the noise-abated maximum Doppler frequency estimation.

8. The receiver as recited in claim 7 wherein the SNR estimate employs a noise power determined from the channel noise and the signal power.

9. A method of operating a wireless communications receiver, comprising:
receiving, at a receiver unit, a radio transmission having Doppler distortion and channel noise; and
determining, by an estimating unit coupled to the receiving unit, a noise-abated maximum Doppler frequency estimate for the Doppler distortion employing a weighted sum of correlations of demodulated pilot data from said radio transmission;
wherein determining the noise-abated maximum Doppler frequency estimate uses a finite difference approximation.

10. The method as recited in claim 9 wherein determining the noise-abated maximum Doppler frequency estimate uses a signal power employing a first derivative of the zero order Bessel function of the first kind.

11. The method as recited in claim 9 wherein determining the noise-abated maximum Doppler frequency estimate uses a signal power employing extrapolation.

12. The method as recited in claim 9 wherein determining the noise-abated maximum Doppler frequency estimate uses first and second order derivatives based on properties of the discrete Fourier transform.

13. The method as recited in claim 9 wherein determining the noise-abated maximum Doppler frequency estimate is provided as one of a range of Doppler frequencies.

14. The method as recited in claim 9 further comprising determining a signal-to-noise ratio (SNR) estimate based on the noise-abated maximum Doppler frequency estimate.

15. The method as recited in claim 14 wherein the SNR estimate employs a signal power determined from the noise-abated maximum Doppler frequency estimation.

16. The method as recited in claim 15 wherein the SNR estimate employs a noise power determined from the channel noise and the signal power.

* * * * *

UNITED STATES PATENT AND TRADEMARK OFFICE
CERTIFICATE OF CORRECTION

PATENT NO. : 9,900,185 B2
APPLICATION NO. : 13/614317
DATED : February 20, 2018
INVENTOR(S) : Badreddine Noune It is certified that error appears in the above-identified patent and that said Letters Patent is hereby corrected as shown below:

In the Specification

In Column 4, Line 64, delete "$= \sum_{n=0}^{L-1} E\{h_l[n](h_{l+\tau}[n])^*\} = \left(\sum_{n=0}^{L-1} E\{h_l[n]\}^2\right) J_0(2\pi f_D \tau)$" and insert -- $= \sum_{n=0}^{L-1} E\{h_l[n](h_{l+\tau}[n])^*\} = \left(\sum_{n=0}^{L-1} E\{h_l[n]\}^2\right) J_0(2\pi f_D \tau)$ --

In Column 5, Line 5 approximately, delete "$\rho(\tau) = \sum_{k \in S} \rho_k(\tau) = |S| \left(\sum_{n=0}^{L-1} E\{h_l[n]\}^2\right) J_0(2\pi f_D \tau)$" and insert -

$\rho(\tau) = \sum_{k \in S} \rho_k(\tau) = |S| \left(\sum_{n=0}^{L-1} E\{h_l[n]\}^2\right) J_0(2\pi f_D \tau)$ --

In the Claims

In Claim 9, Column 16, Line 47, after --receiving-- delete ", at a receiver unit,"

In Claim 9, Column 16, Lines 49-50, after --determining-- delete ", by an estimating unit coupled to the receiving unit,"

Signed and Sealed this
Tenth Day of July, 2018

Andrei Iancu
*Director of the United States Patent and Trademark Office*